US012754337B2

(12) United States Patent
Nimsaila et al.

(10) Patent No.: US 12,754,337 B2
(45) Date of Patent: Oct. 6, 2026

(54) DOMAIN DECOMPOSITION FOR HIGH-FREQUENCY ELASTIC FULL WAVEFORM INVERSION METHOD AND SYSTEM

(71) Applicant: CGG SERVICES SAS, Massy Cedex (FR)

(72) Inventors: Kawin Nimsaila, Katy, TX (US); Gang Liu, Katy, TX (US); Zedong Wu, Katy, TX (US); Zhigang Zhang, Houston, TX (US); Ping Wang, Sugar Land, TX (US)

(73) Assignee: CGG SERVICES SAS, Massy Cedex (FR)

( * ) Notice: Subject to any disclaimer, the term of this patent is extended or adjusted under 35 U.S.C. 154(b) by 444 days.

(21) Appl. No.: 18/512,089

(22) Filed: Nov. 17, 2023

(65) Prior Publication Data

US 2024/0310544 A1 Sep. 19, 2024

Related U.S. Application Data

(60) Provisional application No. 63/490,269, filed on Mar. 15, 2023.

(51) Int. Cl.
*G01V 1/34* (2006.01)
*G01V 1/28* (2006.01)

(52) U.S. Cl.
CPC .............. *G01V 1/345* (2013.01); *G01V 1/282* (2013.01)

(58) Field of Classification Search
CPC ......... G01V 1/345; G01V 1/282; G01V 20/00
See application file for complete search history.

(56) References Cited

U.S. PATENT DOCUMENTS

| | | | | |
|---|---|---|---|---|
| 10,976,457 | B2 * | 4/2021 | Cooper | G01V 1/306 |
| 10,983,234 | B2 * | 4/2021 | Turquais | G01V 1/345 |
| 11,105,942 | B2 * | 8/2021 | Alwon | G01V 1/364 |
| 11,215,720 | B2 * | 1/2022 | Wang | G01V 1/282 |

OTHER PUBLICATIONS

Albert Tarantola, "Inversion of seismic reflection data in the acoustic approximation," Geophysics, Aug. 1984, pp. 1259-1266, vol. 49, No. 8.
Patrick Lailly, "The Seismic Inverse Problem as a Sequence of Before Stack Migrations," Conference on Inverse Scattering: Theory and Application, 1983, pp. 206-220, SIAM, Philadelphia, PA.
Peter Mora et al., "Elastic versus acoustic inversion for marine surveys," Geophysical Journal International, Apr. 2018, vol. 214, pp. 596-622.

(Continued)

*Primary Examiner* — An H Do
(74) *Attorney, Agent, or Firm* — PATENT PORTFOLIO BUILDERS PLLC

(57) ABSTRACT

A method for imaging a formation of a subsurface includes receiving input data d related to the subsurface, generating synthetic data u related to the subsurface, by applying an implicit finite-difference approach to a reflectivity model r, updating a velocity model V based on the input data d and the synthetic data u, and generating an image of the formation in the subsurface based on the updated velocity model, wherein the formation is used to locate natural resources.

15 Claims, 11 Drawing Sheets

(56) References Cited

OTHER PUBLICATIONS

Qingchen Zhang et al., "Hybrid-domain simultaneous-source full waveform inversion without crosstalk noise," Geophysical Journal International, Dec. 2018, pp. 1659-1681, vol. 215, issue 3.
Robin M. Weiss et al., "Solving 3D Anisotropic Elastic Wave Equations on Parallel GPU Devices," Geophysics, 2013, F7-F15, vol. 78, No. 2, pp. 1-21.
Uri M. Ascher et al., "Implicit-Explicit Runge-Kutta Methods for Time-Dependent Partial Differential Equations," Applied Numerical Mathematics, 1997, vol. 25, issues 2-3, 19 pages.
Nicholas T. Okita et al., "High-performance computing strategies for seismic-imaging software on the cluster and cloud-computing environments," 2021, Geophysical Prospecting, vol. 70, pp. 57-78.

* cited by examiner

DOMAIN DECOMPOSITION FOR HIGH-FREQUENCY ELASTIC FULL WAVEFORM INVERSION METHOD AND SYSTEM

BACKGROUND OF THE INVENTION

Technical Field

Embodiments of the subject matter disclosed herein generally relate to a system and method for processing seismic data for extracting information related to a formation in the subsurface, and more particularly, to identifying and/or characterizing subsurface resources for exploitation based on Full Waveform Inversion (FWI) performed in parallel on plural graphic processing units of a computing system.

Discussion of the Background

The FWI is a powerful computational technique widely employed in various fields, for example, seismic data analysis for determining the location of subsurface resources, or a subsurface formation that is appropriate for the storage of carbon, or a solid subsurface formation that is appropriate for supporting a wind turbine. In seismic exploration, FWI plays a pivotal role in characterizing subsurface geological structures with unparalleled precision. By comparing observed seismic waveforms with simulated waveforms generated from theoretical models, FWI enables geophysicists to infer detailed information about subsurface properties such as velocity, density, and impedance. This information is invaluable in the oil and gas industry for optimizing reservoir management, reducing exploration risks, and improving hydrocarbon recovery. Beyond geophysics, FWI finds application in diverse scientific domains, including medical imaging, non-destructive testing, and materials science. Its ability to reconstruct high-resolution images or models by iteratively minimizing the misfit between observed and predicted data makes it a versatile tool for enhancing our understanding of complex systems and advancing various scientific endeavors.

Hydrocarbon exploration and development uses waves (e.g., seismic waves or electromagnetic waves) to explore the structure of underground formations on land and/or at sea (i.e., formations under the seafloor). As schematically illustrated in FIG. 1, waves emitted by a source 110 at a known location penetrate an explored subsurface 120 and are reflected, refracted or diffracted at interfaces 112, 122, 124, 126 that separate the subsurface's layers or formations 121, 123, 125, 127 having different layer properties. Sensors 130 (only one is shown for simplicity), which may be towed by a vessel 132 on streamers, or may be independently placed in the water or ocean bottom (not shown), detect the waves and record one or more of their characteristics, for example, pressure, one-dimensional displacement, three-dimensional displacement, etc. Note that, as used herein, the term "formation" refers to any geophysical structure into which source energy is injected to perform seismic surveying, e.g., land, ocean bottom, transition zone or marine based. This means that the configuration shown in FIG. 1 may also be used on land, in which case the source 110 is carried by a truck or other means from one point to another, and the sensors 130 are located on the surface, or buried in the subsurface. Note that the sensors 130 are known in the art and they can include hydrophones, accelerometers, geophones, gravitational sensors, electromagnetic sensors, etc.

In order to understand the structure of the explored underground formation (layers 121, 123, 125, and 127 and interfaces 112, 122, 124, and 126 in the specific example of FIG. 1), various steps are performed on the data "d" recorded by sensors 130, as part of the FWI processing of the recorded seismic data. FWI is capable of deriving high-resolution velocity models "V" of the subsurface (Earth) parameters (e.g., pressure-wave velocity "$V_p$", shear-wave velocity "$V_s$", viscosity, density "ρ", impedance, reflectivity, anisotropy, etc.), from seismic data recordings d. The velocity model V may include one or more of these earth parameters. FWI is a nonlinear inversion scheme with the objective of determining subsurface properties for the model V which minimize a misfit (described, for example, by a cost function J) between the observed/recorded/measured seismic data d (also described interchangeably as real or field here) and synthetic data u, which is calculated/estimated from a candidate reflectivity model r, which is an earth model or a model of the earth parameters. These earth models r could have been calculated using, for example, travel time tomography on the seismic data, previous implementations of FWI on the seismic data, or well log information.

The misfit is commonly defined by the cost or objective function J, which measures, for example, the least-squares data difference between the observed d and synthetic data u (i.e., data calculated, for example, as discussed in [1] or [2]). The synthetic data u may be obtained from the reflectivity model r. FWI is an iterative approach requiring an a priori initial model, which is then repeatedly updated via an inversion algorithm. In an ideal case, the updated velocity model V will converge to the true model representing the observed data d. An exemplary flow of a conventional FWI process is presented in FIG. 2. This process starts by receiving in step 200 the initial velocity model, and in step 205, the recorded data d. Optionally, in step 210, the method may receive additional information about the surface, for example, anisotropy parameters, which are known from other surveys or methods. Then, the FWI performs a step 220 of generating a reflectivity model r for the surveyed subsurface, and in step 222 the method generates the synthetic data set u, based on the reflectivity model r and the recorded data d. The method then updates, in step 224, the current velocity model V based on a comparison (objective function J) between the synthetic data u and the recorded data d. This step typically uses the FWI process. Steps 220 to 224 are iteratively performed until a loop-exiting criterion, LEC, is met in step 230. The LEC may be related to a model's convergence or simply a predetermined number of iterations. In the case of complex models with multiple non-independent parameters, different subsets of the parameter values may be updated at different iterations. Then, the method generates in step 232 an image of the subsurface domain based on the updated velocity model. The image is indicative of one or more formations in the subsurface that have desired parameters, i.e., contain oil, or contain empty spaces for storing $CO_2$, or include a desired resource, or have a certain strength that is desired for supporting wind turbines.

The inversion process is computationally very demanding on a corresponding compute device and thus, it is of great interest to identify the most effective compute device for FWI. Traditionally, powerful computers (or supercomputers) are increasingly using powerful Central Processing Units (CPUs) with multiple cores and higher processing frequencies. Recently, Graphics Processing Unit (GPU) accelerators have proved to be much more effective than CPUs for wave-propagation, which is the most compute intensive part of FWI. For this reason, GPUs are becoming a preferred compute device for FWI algorithms.

Acoustic FWI has proved to be effective to automatically build a velocity model and improve the sub-surface imaging for different data types and geologic settings [3]. However, the missing elasticity in acoustic FWI may result in non-negligible effects in current FWI results. The authors in [4] use synthetic examples to show that, even in marine settings, accounting for elastic effects is important. Therefore, elastic FWI is gradually becoming the method of choice for automatic velocity model building.

However, the compute cost and memory requirement for elastic seismic wave simulation needed for elastic FWI are much more demanding than those for acoustic FWI. Therefore, there is a need for developing an elastic FWI algorithm that is GPU based and can overcome the memory limitation of one single GPU card during processing the seismic wave propagation.

SUMMARY OF THE INVENTION

According to an embodiment, there is a method for imaging a formation of a subsurface, and the method includes receiving input data d related to the subsurface, generating synthetic data u related to the subsurface, by applying an implicit finite-difference approach to a reflectivity model r, updating a velocity model V based on the input data d and the synthetic data u, and generating an image of the formation in the subsurface based on the updated velocity model, wherein the formation is used to locate natural resources.

According to another embodiment, there is a computing system for imaging a formation of a subsurface, and the computing system includes plural compute nodes, each compute node including an interface configured to receive input data d related to the subsurface and plural graphics processor units, GPUs connected to the interface. The GPUs are configured to generate synthetic data u related to the subsurface, by applying an implicit finite-difference approach to a reflectivity model r, update a velocity model V based on the input data d and the synthetic data u, and generate an image of the formation in the subsurface based on the updated velocity model, wherein the formation is used to locate natural resources.

According to yet another embodiment, there is a non-transitory computer readable medium including computer executable instructions, where the instructions, when executed by one or more graphics processor units, implement the methods discussed herein.

BRIEF DESCRIPTION OF THE DRAWINGS

For a more complete understanding of the present invention, reference is now made to the following descriptions taken in conjunction with the accompanying drawings, in which:

FIG. 10A illustrates a salt halo around a given formation when acoustic FWI is applied while

DETAILED DESCRIPTION OF THE INVENTION

The following description of the embodiments refers to the accompanying drawings. The same reference numbers in different drawings identify the same or similar elements. The following detailed description does not limit the invention. Instead, the scope of the invention is defined by the appended claims. The following embodiments are discussed with regard to an elastic FWI process ran on plural GPUs via domain decomposition. However, the embodiments to be discussed next are not limited to seismic data, but may be applied to other types of data, for example, electromagnetic wave data or acoustic data. Also, the embodiments discussed herein are not limited to applying the elastic FWI processing to the plural GPUs for detecting a formation in the subsurface, but may be applied to an elastic FWI processing in other fields, for example, medical imaging.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 1:
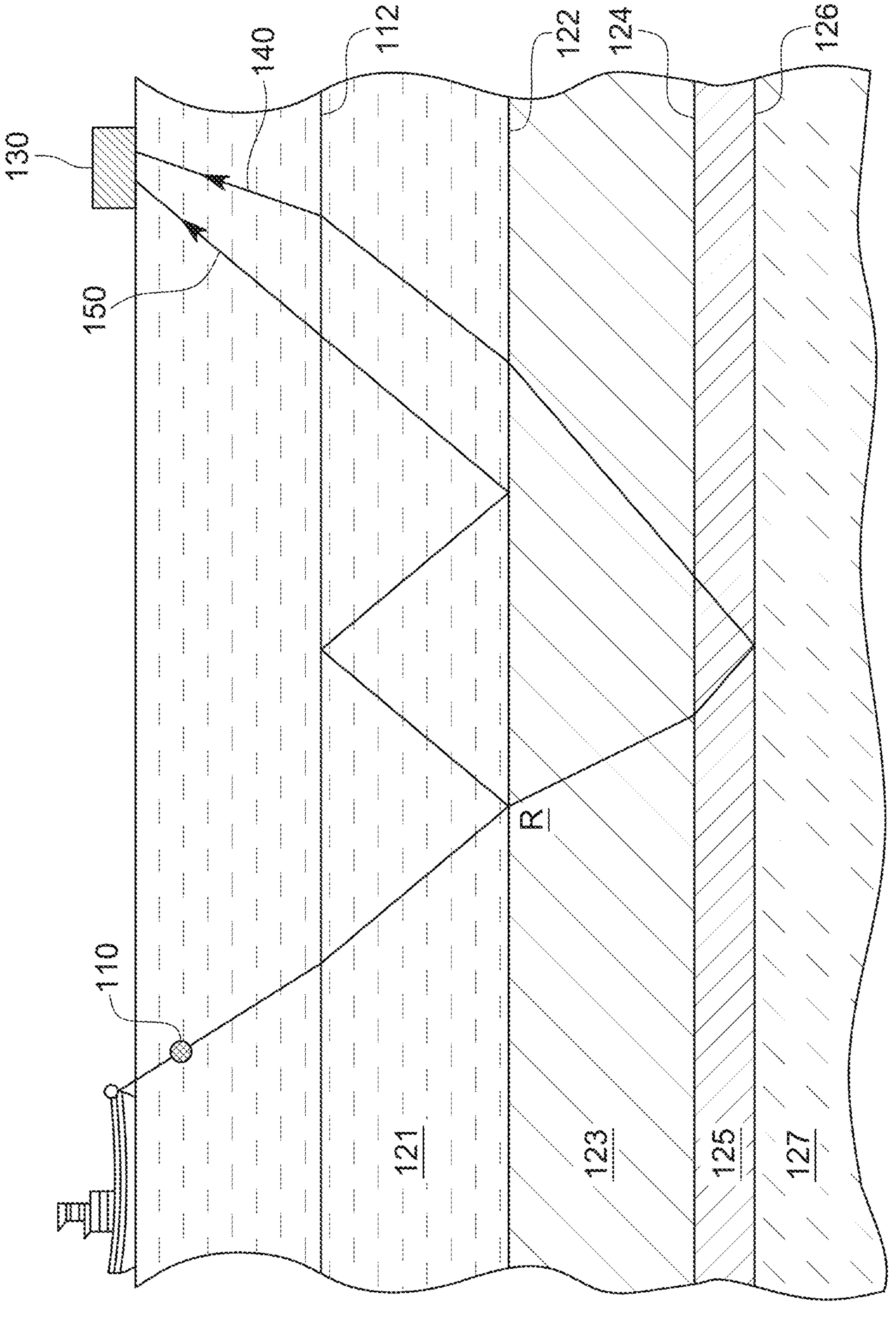
FIG. 1 is a schematic diagram of a marine-based seismic acquisition system.
Figure 2:
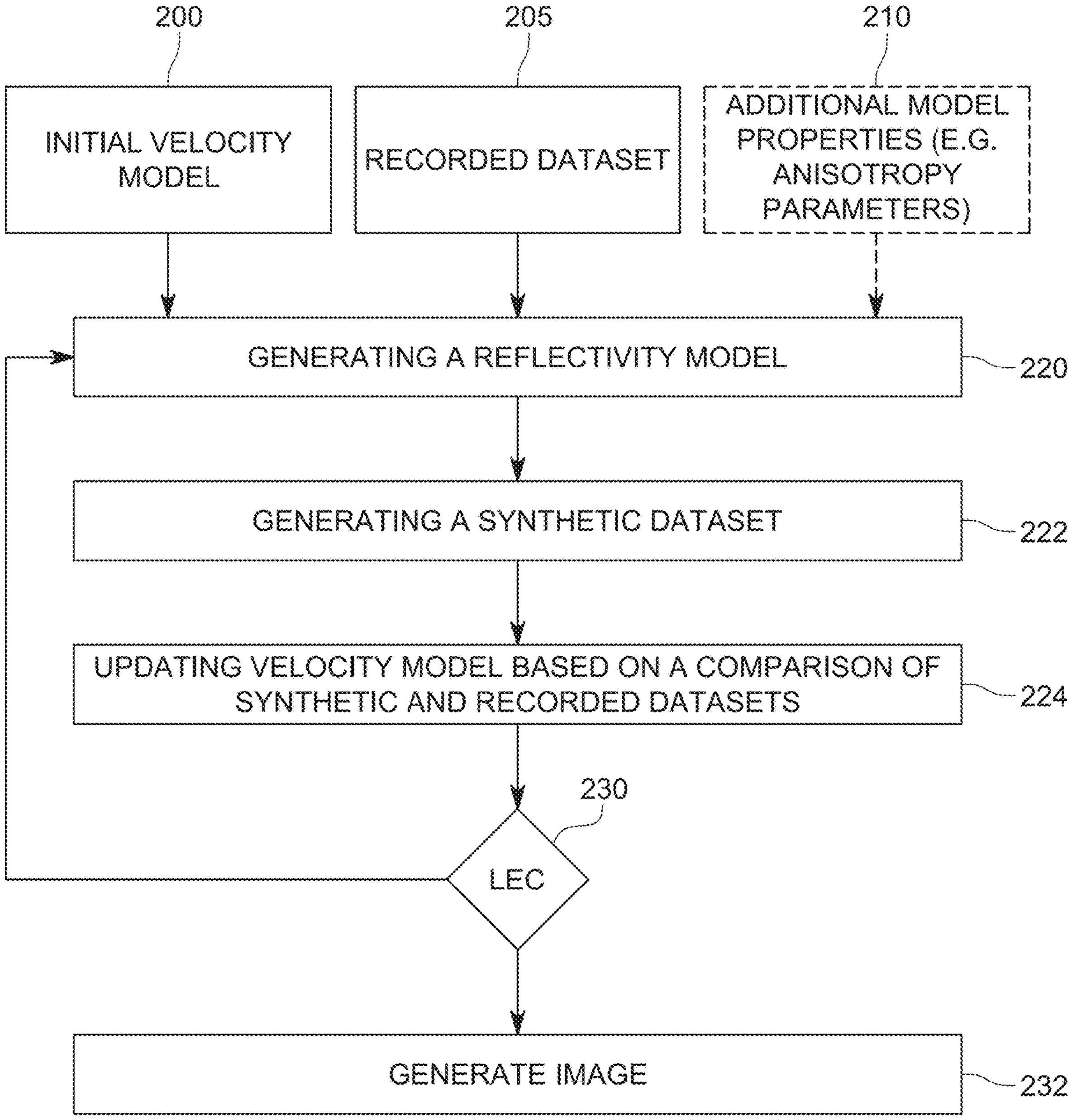
FIG. 2 is a schematic flow chart of a method that uses FWI for updating an earth's velocity model and generating an image of the subsurface based on the updated velocity model.
Figure 3:
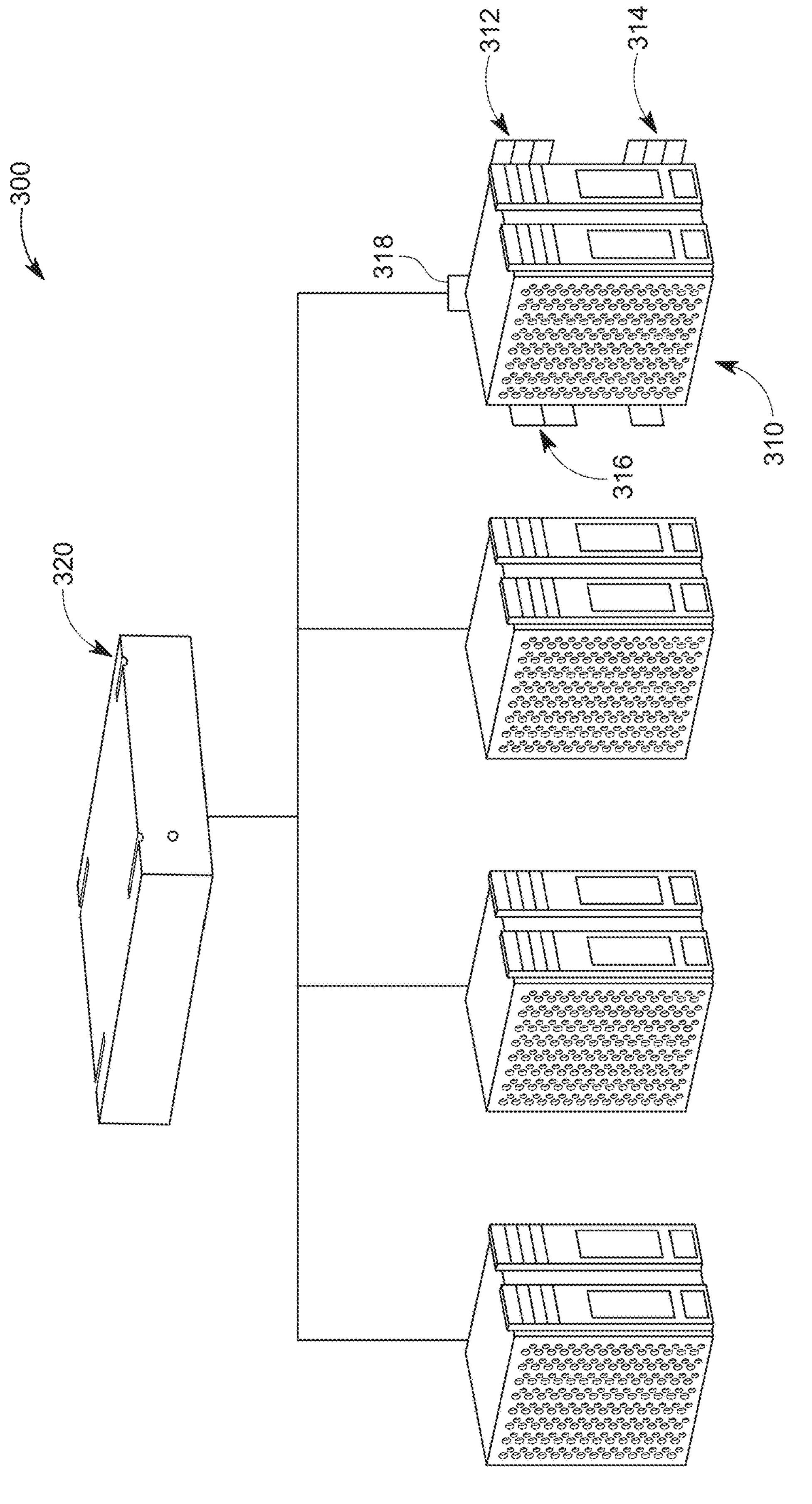
FIG. 3 illustrates a cluster of compute nodes connecting to each other through a network switch.

The FWI method uses forward modeling for calculating/estimating the seismic waves at a given point of interest in the subsurface, based on the known seismic waves generated by one or more sources, which are typically located at the earth's surface. The forward modeling is the method that governs partial differential equations for seismic wave simulation. It is used to generate the synthetic dataset u, and is the main engine in FWI application. FWI is typically running on a computing system 300 that includes multiple compute nodes 310, as illustrated in FIG. 3. Note that each compute node 310 includes a given number of CPUs 312 and a given number of GPUs 314, as well as storage devices 316 and a network interface card 318. The network interface card 318 of each compute node 310 is linked (in a wired or wireless way) to a network switch 320, so that communication between any two compute nodes in the computing system 300 is possible. In one application, a compute node is a personal computer or a laptop. In another application, the compute node is a server, or a smart device. One skilled in the art would understand that a compute node may be any device that has plural GPUs.

Figure 4:
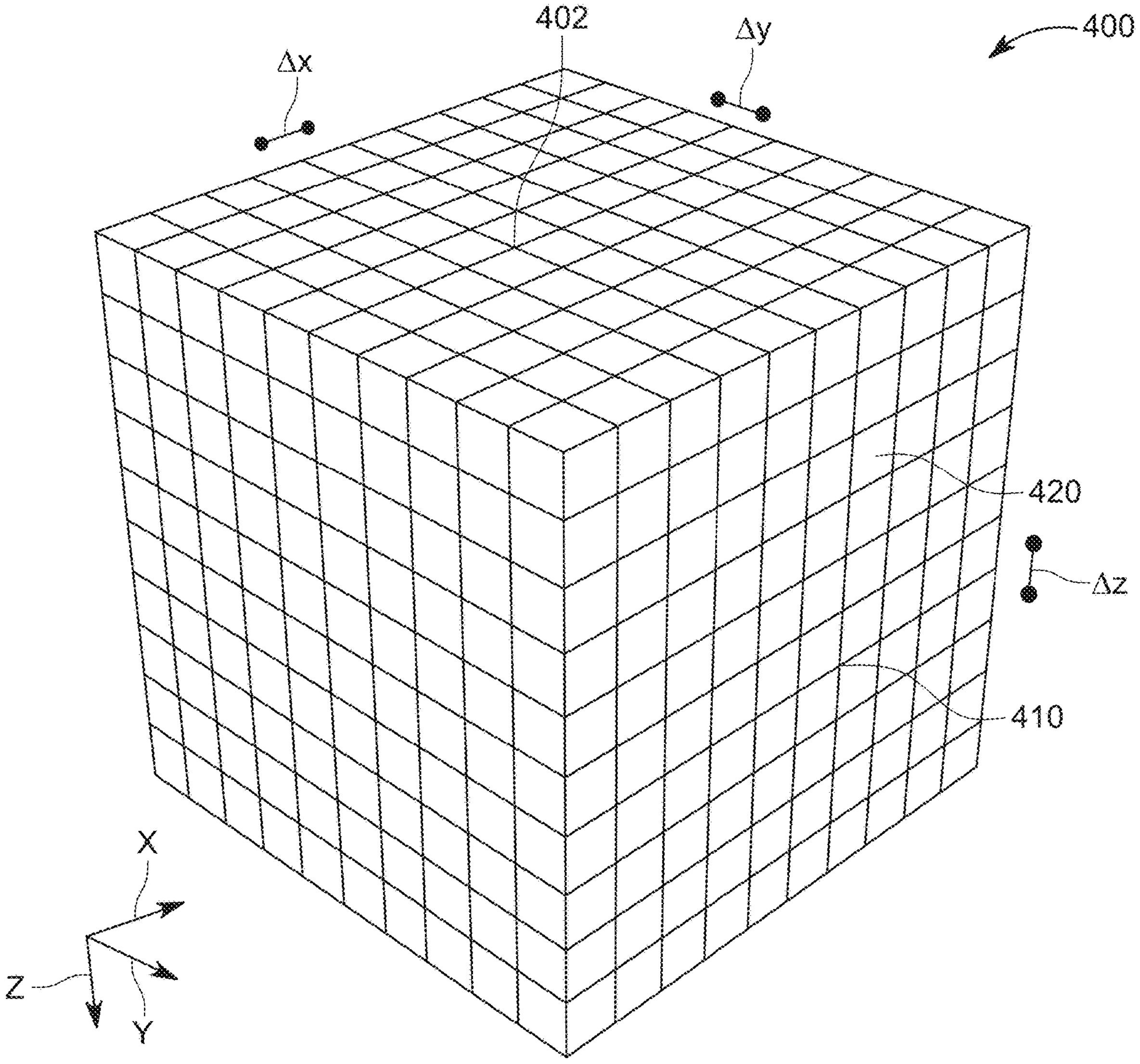
FIG. 4 illustrates a computational grid for wave simulation and a 3D subsurface offset domain with grid spacing of $\Delta x$, $\Delta y$, and $\Delta z$.

Because a seismic source generates seismic waves periodically, for example, every couple of seconds or any other time interval, sometime for days if not weeks during a seismic survey campaign, a large number of waves is generated and all these waves need to be propagated (mathematically, i.e., through calculations) into the subsurface and reflected from many interfaces. Thus, wave simulation for each shot gather is performed through a numerical implementation such as finite-difference (FD) method, which discretizes the wavefield in the subsurface offset domain. An example of the discretization of the subsurface offset domain 400 is shown in FIG. 4. For this example, it might be the case that the source sits at location given by point 402 and the wave generated by the source needs to be propagated to a point 410 in the subsurface. The discretization of domain 400 means that plural points are generated ($N_x \times N_y \times N_z$ in this case, where $N_x$ is the number of points along the x direction, $N_y$ is the number of points along the y direction, and $N_z$ is the number of points along the z direction), and all the calculations of a model are performed only at a subset of these points. The method will calculate the propagation of the wave from point 402 to point 410 by calculating the propagation through each cube 420, based on differential equations involving the wave equation. The modeling size is defined as $N_x \times N_y \times N_z$ such that a grid point 410 in space can be represented as $(x, y, z)=(i\Delta x, j\Delta y, k\Delta z)$ where $\Delta x$, $\Delta y$ and $\Delta z$ represent grid spacing in x, y and z directions, respectively. The integer counters have the ranges $1 \le i \ge N_x$, $1 \le j \le N_y$, $1 \le k \le N_z$.

The compute node 310 memory requirement for such wave simulation is proportional to the modeling size, i.e., $N_x \times N_y \times N_z$. The maximum frequency in FWI is determined by GPU memory capacity in one compute node. As higher frequency FWI with more accurate physics as elastic FWI is gaining popularity, the memory requirement of seismic wave modeling could exceed the GPU memory capacity of a single compute node. Thus, it is not possible to perform wave simulation using a single compute node 310. For high frequency FWI, the modeling size is generally in the range of $1{,}000^3 \le N_x \times N_y \times N_z \le 2{,}000^3$. Note that the term "high frequency" refers to the focus on capturing and analyzing high-frequency components of the seismic data. Seismic waves consist of various frequencies, and high-frequency waves can provide finer details about the subsurface than low-frequency waves. High-frequency FWI emphasizes the use of these higher-frequency components to improve the resolution and accuracy of subsurface imaging.

Figure 5:
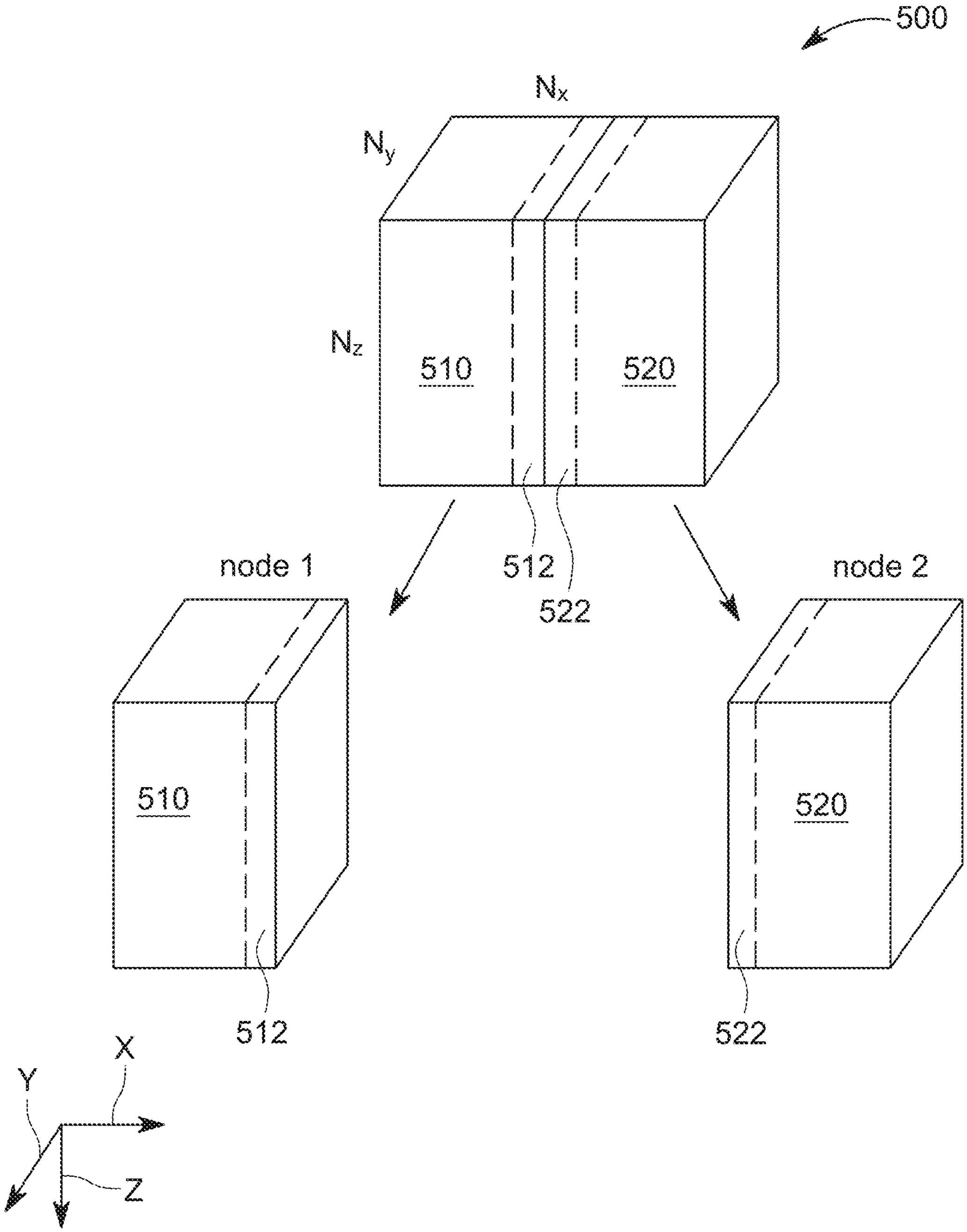
FIG. 5 illustrates a domain decomposition of the subsurface offset domain into two subdomains, with the shaded area representing the data exchange for finite-difference computation required by adjacent subdomains.

To overcome the memory limitation faced by a single compute node, multiple compute nodes can be used for FWI wavefield simulation via domain decomposition. The whole subsurface offset domain (corresponding to a volume of the surveyed subsurface) is decomposed into multiple subdomains, where the required memory for each subdomain can be fit into a single compute node. For example, the decomposition process is illustrated in FIG. 5, where the whole domain 500 is divided into two subdomains 510 and 520 along the x direction.

The FWI calculations can then be performed in parallel, for each subdomain 510 and 520, each compute node calculating wavefields in a corresponding subdomain. In this way, no matter how large the whole domain is, it can be decomposed into as many subdomains as necessary so that each subdomain can be handled by a compute node. To ensure accuracy of the finite-difference method, sufficient overlapping areas 512 and 522 are needed between neighboring subdomains 510 and 520, respectively. An overlapping area 512/522 is defined as a stencil size, which is discussed in detail later. The overlapping area is transferred across the GPU nodes via network switch 320. This action can add significant overhead to the simulation process because the network bandwidth is often multiple-orders smaller than the GPU bandwidth.

Domain decomposition is an approach that overcomes the memory limitation of the single compute node by utilizing multiple compute nodes for one wavefield simulation. Although domain decomposition is already used in the field, it still has challenges that prevent the method to be feasible and affordable, see, for example, the discussion in [5]. The most challenging issue for the existing approach is the extreme imbalance between the GPU bandwidth and the network bandwidth. In this regard, the network bandwidth is currently in the range of 10 Gbit/sec (1.25 GByte/sec)-200 Gbit/sec (25 GByte/sec), which is much slower than the GPU bandwidth, which is in the range of 1,000-8,000 GByte/sec. This large difference in bandwidth makes data exchange prohibitively expensive compared to the GPU computation cost and thus, makes the domain decomposition approach less attractive.

The inventors have found that reducing the amount of data exchange between the compute nodes will balance the bandwidth data exchange among the various compute nodes and within each compute node. According to an embodiment, such a method uses implicit finite-differences for solving the differential equations for the domain 400 in FIG. 4, instead of an explicit finite-differences approach.

More specifically, the finite-difference method is utilized for solving differential equations by approximating the derivatives with finite differences. Mathematically, the first order derivative of a quantity, P, for example, the pressure, with respect to the spatial variable, x, can be approximated using explicit finite-difference as follows.

$$\frac{\partial P(x_i)}{\partial x} = P'(x_i) \approx \frac{1}{\Delta x} \sum_{j=-N}^{N} a_j P(x_{i+j}), \tag{1}$$

where $a_j$ with $-N \le j \le N$ is an explicit finite-difference coefficient and N, known as the stencil size, represents the order of accuracy. Explicit finite-difference is widely used for wave simulation because of its straightforward implementation, see, for example, [6]. However, this approach requires a large stencil size to obtain a high order of accuracy and therefore, it is not a good candidate for domain decomposition.

Implicit finite-difference is another approach that produces high accuracy with a smaller stencil size, see, for example, [7]. Its mathematical formulation can be expressed as follows.

$$\sum_{j=-M}^{M} b_j P'(x_{i+j}) = \frac{1}{\Delta x} \sum_{j=-N}^{N} a_j P(x_{i+j}). \tag{2}$$

Here $b_j$, with $-M \leq j \leq M$ is an implicit finite difference coefficient and M+N represents the total stencil size. Note that the explicit finite difference of equation (1) is a reduced form of the implicit finite difference when M=0 and $b_0=1$.

Figure 6:
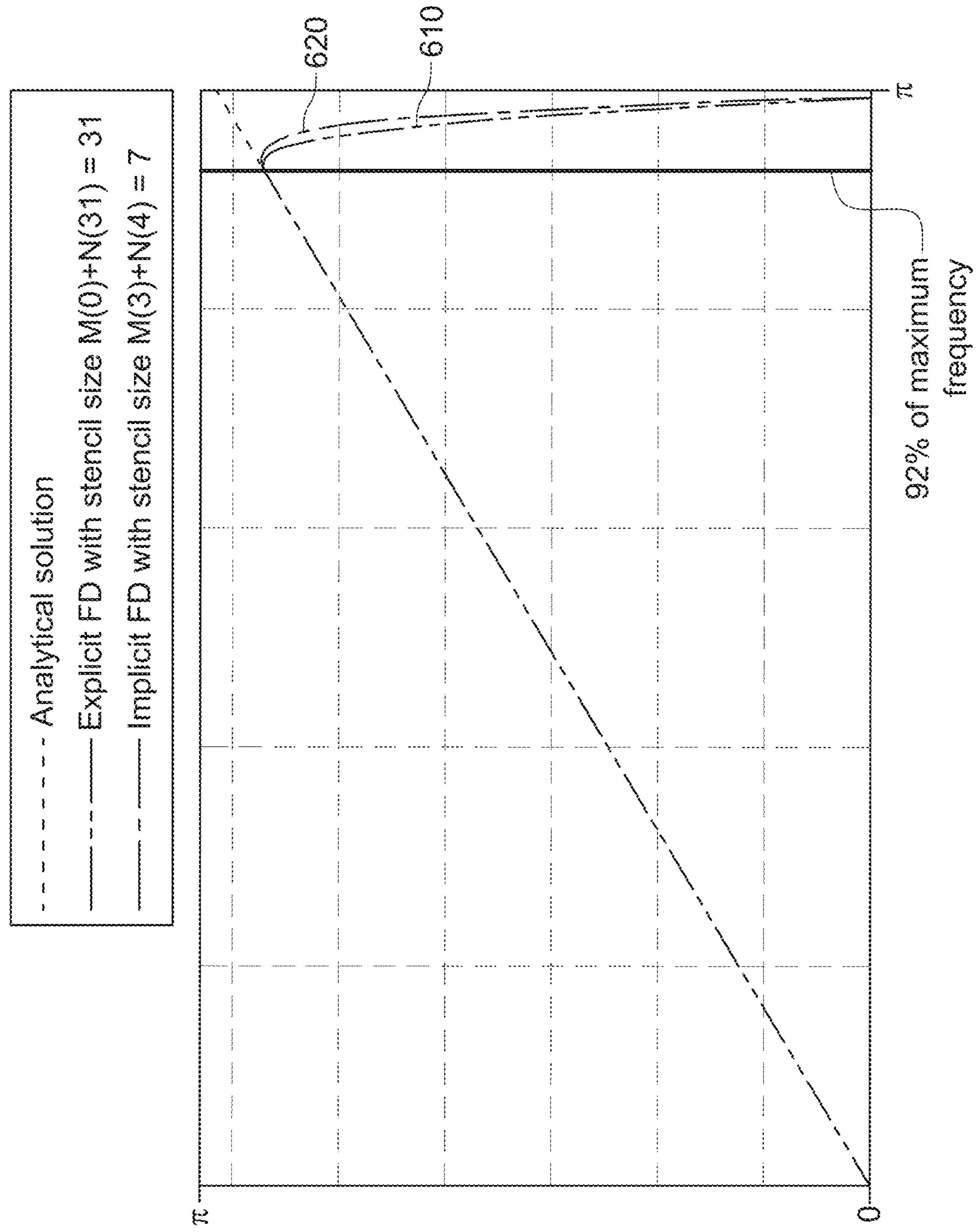
FIG. 6 shows the performance of the first derivative in frequency spectra using implicit and explicit finite-difference calculations.

FIG. 6 shows an example of the accuracy of the first order derivative using explicit and implicit finite-difference schemes with different stencil sizes. The figure shows the solutions of the first derivative in frequency spectra using implicit and explicit FD. To obtain an accuracy of up to 92% of maximum frequency, an explicit FD scheme 610 requires a much larger stencil size (31) compared to an implicit scheme 620 that has a stencil size (7). Because implicit finite-difference requires a smaller stencil size, it can be utilized to reduce the overhead from the cross-compute node data exchange while still maintaining the desired accuracy.

In addition, the direction with the greatest number of grid points is chosen as the domain splitting direction to minimize the overall data exchange. In one embodiment, it is possible to parallelize network communication and GPU computation as they can be performed independently. Therefore, the total running time is that of the slower process, as opposed to the sum of both processes.

Figure 7:
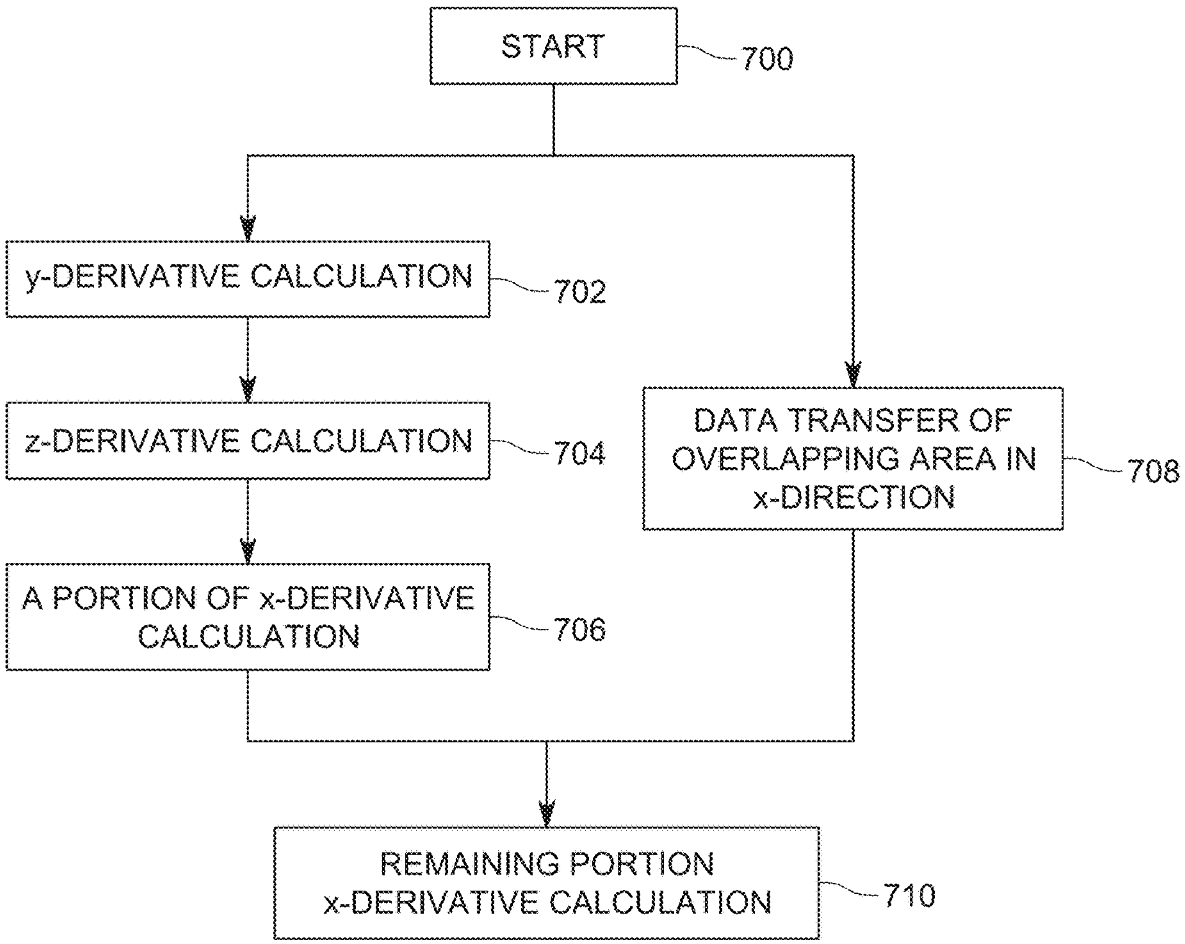
FIG. 7 is a flow chart of a method for performing concurrent spatial derivatives computation and data exchange communication.

The method of domain decomposition using the implicit finite-difference scheme is now discussed in more detail with regard to FIG. 7. Although the traditional domain decomposition methods add an overhead cost due to the data exchange for the overlapping area(s), the process discussed now introduces two novel schemes to reduce the overall overhead cost from data exchange.

The first novel scheme is related to using optimized implicit finite-difference scheme to reduce the overlapping area. Explicit finite-difference scheme is widely used for wave equation simulation because of its straightforward implementation (see, [6]). However, this approach requires a large stencil size to obtain high accuracy. Therefore, the data exchange for the overlapping area (which is proportional to the stencil size) is substantially large.

In this regard, note that a connection between the stencil size and the overlapping area of two subdomains in domain decomposition is related to the communication requirements and the numerical accuracy of a parallel simulation. The stencil size determines how many neighboring grid points or nodes (in FIG. 4) are involved in the numerical approximation of values at a particular grid point (e.g., point 410). A larger stencil size generally results in a more accurate approximation of derivatives or values but may also require more communication between neighboring subdomains.

In domain decomposition, when a computational domain is divided into smaller subdomains for parallel processing, an overlapping area 512/522 is introduced at the boundaries of adjacent subdomains 510 and 520. This overlapping area 512/522 is used to exchange information between neighboring subdomains to ensure that boundary conditions and interactions between subdomains are properly handled.

Thus, the choice of stencil size can affect the communication requirements between subdomains in a domain decomposition approach. Specifically, a larger stencil size can require more neighboring grid points to be accessed for computation, potentially leading to more data exchange between subdomains. The stencil size may influence the number of cells needed in the overlapping area. A larger stencil often requires a wider overlapping region to accommodate the data needed for computations. There is a trade-off between stencil size and communication overhead. While a larger stencil may improve numerical accuracy, it can also increase the amount of data that needs to be exchanged between subdomains during parallel computations. This can lead to increased communication costs and reduced parallel efficiency.

The specific choice of stencil size and overlapping area depends on the nature of the problem, the available computational resources, and the goals of the parallel simulation. Achieving the right balance is often a part of the optimization process when parallelizing numerical simulations to ensure both accuracy and efficiency in a parallel computing environment.

In this embodiment, to reduce the data exchange cost, according to this first novel scheme, an optimized implicit finite-difference approach is used. The stencil size for implicit finite-difference can be generally 3-5 times smaller than the one from explicit finite-difference for the same accuracy. For this implementation, the modeling grid spacing requires the accuracy of spatial derivatives calculation up to 92% of the maximum frequency. With this accuracy level, the stencil size of explicit finite-difference requires 31 grid points for data exchange whereas the proposed implicit finite-difference requires 7 grid points, as previously shown in FIG. 6. Therefore, the proposed approach potentially reduces the data exchange cost by approximately 77%.

To demonstrate the importance of data reduction of the overlapping area 512/522, consider the domain decomposition of the whole modeling medium 500 of size of $N_x \times N_y \times N_z$ into two subdomains 510 and 520, where data is split along the x direction (see FIG. 5), i.e., half of the $N_x$ points are in the first subdomain 510 and the other half of the $N_x$ points are in the second subdomain 520. The modeling size of each subdomain is thus given by $$\frac{N_x}{2} \times N_y \times N_z.$$

For this discussion, it is assumed that the number of grid points for the overlapping area 512/522 is equal to $A_x$. $BW_{GPU}$ and $BW_{network}$ are the GPU and network bandwidth, which represent the performance of GPU computation and data transfer through network, respectively.

The GPU computation cost, $C_{GPU}$, for each subdomain can be approximated as:

$$C_{GPU} = \frac{\frac{N_x}{2} \times N_y \times N_z}{BW_{GPU}}, \tag{1}$$

while the data transfer cost, $C_{network}$, can be approximated as:

$$C_{network} = \frac{A_x \times N_y \times N_z}{BW_{network}}. \tag{2}$$

To minimize overhead from data transfer, the data transfer cost must be less than or equal to the GPU computation cost. Thus, the ideal stencil size for the overlapping area can be computed as:

$$C_{network} \le C_{GPU} \Rightarrow \frac{A_x \times N_y \times N_z}{BW_{network}} \le \frac{\frac{N_x}{2} \times N_y \times N_z}{BW_{GPU}} \Rightarrow A_x \le \frac{N_x BW_{network}}{2BW_{GPU}}. \quad (3)$$

For high frequency elastic FWI, $N_x$ is approximately 1,600 grid points. The average network bandwidth, $BW_{network}$, in the current industry is 12.5 Gbyte/see and the GPU bandwidth, $BW_{GPU}$, is approximately 4,000 Gbyte/sec. From equation (3), the ideal overlapping area can be computed as follows:

$$A_x \le \frac{1{,}600 \times 12.5}{2 \times 4{,}000} \rightarrow A_x \le 2. \quad (4)$$

Thus, it is not possible to completely hide the data transfer cost since the implicit finite-difference requires a stencil size of 7, which is larger than the calculated $A_x$. In fact, the data transfer cost is approximately 3 to 4 times more expensive than the GPU computation cost. This high data transfer cost may be addressed with the second novel scheme, which is designed to mitigate the imbalance of GPU computation and network communication.

To further minimize the amount of data exchange, according to an embodiment, the direction with the greatest number of point grids is chosen as the domain splitting direction. For example, assuming the number of grid points in x direction is the largest, i.e., $N_x \ge N_y$ and $N_x \ge N_z$, the direction of splitting in x direction will give the least data exchange (which is proportional to $N_y \times N_z$) since $N_y \times N_z \le N_y \times N_x$ and $N_y \times N_z \le N_x \times N_z$.

Thus, the second novel scheme is related to parallelizing computation and network communication. Note that each of the first and second novel schemes discussed herein may be applied independent of each other to a given system. However, in one application, both schemes are applied to the same system.

The GPU accelerator 314 and network interface card 318 (see FIG. 3) are the main components of each compute node 310. Their functions can be performed independently. For each time step in forward modeling, the spatial derivatives (in x, y, z direction) computation and data exchange communication can be performed concurrently. More specifically, as shown in FIG. 7, the process starts at step 700 by initiating the size of the domain, the number of subdomains, by determining the axis having the largest number of grid points, and then slicing the domain into the subdomains along the determined axis (which means that the data exchange is in x direction). Note that the method is discussed herein for only two subdomains, but the domain may be sliced into plural subdomains.

In step 702, the full portion of the y derivative calculation is performed and in step 704, the full portion of the z derivative calculation is performed, independent of the y derivative calculation because the spatial derivative calculation in y and z directions does not need data from the neighbor subdomain. For the spatial derivative in the x direction, most of the grid points can be computed independently in step 706 of the neighbor subdomain. Only a portion of grid point that equals the stencil size next to the subdomain boundary 512/522, as shown FIG. 5, needs to wait for data exchange from neighbor subdomain. This means that the system performs in step 706 the spatial derivative calculation in the x direction for a part of the current subdomain, which is not impacted by the neighbor subdomain, and once data exchange between the subdomains (i.e., different GPUs) is complete in step 708, the system performs in step 710 the spatial derivative in x direction for the remaining portion of the subdomain.

As shown in the first proposed scheme, the data exchange cost is 3 to 4 times more expensive than the spatial derivative cost. The total cost of spatial derivative calculation in x, y and z directions is still less than the data exchange cost. With the proposed concurrent scheme illustrated in FIG. 7, most of the spatial derivative calculation cost can be hidden under the data transfer cost. Thus, the cost is mainly from the data exchange cost, as opposed to the sum of data exchange cost and derivatives calculation cost.

Figure 8:
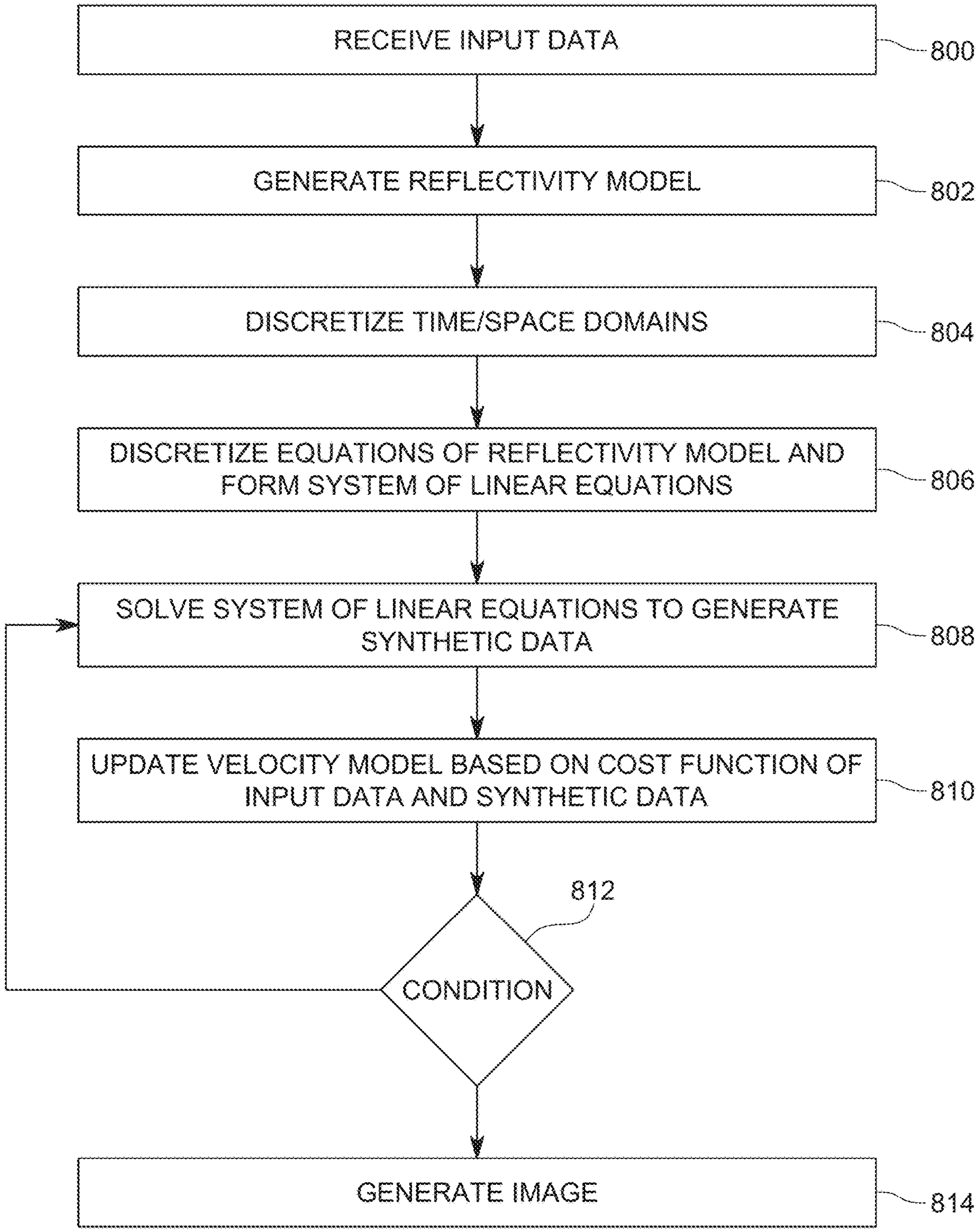
FIG. 8 is a flow chart of a method for identifying a formation in a subsurface by using implicit finite-difference calculations on plural GPUs of a computing system.

A method that integrates both schemes is now discussed with regard to FIG. 8. In step 800, input data (for example, seismic data d) is received. Any data may be processed by this method. The input data varies in time and space. In step 802, a reflectivity model of the surveyed subsurface is obtained, for example, it is generated or received from another seismic survey. A reflectivity model in seismic surveying is a mathematical representation or model used to predict how seismic waves will interact with subsurface rock layers and produce reflections that are recorded by seismic sensors (geophones or hydrophones). Energy sources (such as explosives or vibroseis trucks) generate seismic waves that propagate into the Earth's subsurface. These waves travel through different rock layers with varying properties, including density and acoustic velocity. When a seismic wave encounters a boundary between two subsurface layers with contrasting properties (e.g., from a layer of sandstone to a layer of shale), some of the energy is reflected back to the surface, while the rest continues to propagate deeper into the Earth. A reflectivity model helps predict the amplitude and timing of these reflected seismic waves based on the properties of the subsurface layers. It typically takes into account parameters such as rock properties, angle of incidence, wavelet source, receiver characteristics, etc.

In step 804, the spatial domain and the time domain are discretized. This means that the spatial domain (e.g., offset domain 400 in FIG. 4) is divided into a grid of discrete points 402, 410, typically in 1D, 2D, or 3D. Similarly, the time domain is divided into discrete time steps. In step 806, the partial differential equations (PDEs) that describe the reflectivity model are themselves discretized and a system of linear equations are formed. In one application, this means replacing the partial derivatives with finite difference approximations. For example, a term like $$\frac{\partial u}{\partial t},$$

i.e., a partial derivative of the estimated data u with the time, becomes $$\frac{u_i^{n+1} - u_i^n}{\Delta t},$$

where $$u_i^{n+1}$$

represents the value of the solution at spatial point i and time step n+1, and Δt is the time step. If the estimated data u varies in space, i.e., $$\frac{\partial u}{\partial x},$$

this term becomes $$\frac{u_{i+1}^{n+1} - u_i^{n+1}}{\Delta x},$$

where Δx is the spatial grid spacing along the x axis. Note that the time and space are now discrete, i.e., they do not vary in a continuous way. Also note that for the last term, the time n+1 is the same, but the points where the term u is calculated are different, i.e., i+1 and i. For the FWI approach, a cost function J is used to evaluate a difference between the input data d and the estimated data u, and thus, the example PDEs discussed above may also be applied to the cost function, not only to the reflectivity model.

In step 808, the linear system of equations (for the reflectivity model, or cost function, or velocity model or any combination of these elements) is solved using the implicit finite-difference approach. The implicit finite-difference method introduces such a system of equations at each time step. Note that the values at time step n+1 appear on both sides of the equations for the linear system. This leads to a system of equations, which can be written as a matrix equation $Au^{n+1}=u^n+\Delta tb$, where $u^{n+1}$ is a vector containing the values of the solution at all spatial points at time step n+1, $u^n$ contains the values at time step n, and b is a vector determined by the boundary conditions. A is a matrix that depends on the spatial discretization and the PDEs. Solving the system of linear equations is the most computationally intensive part of the implicit method. Improvements for the calculations at this step may be added, for example, the method discussed in FIG. 7. However, because it is implicit, it is unconditionally stable, meaning that it is possible to choose larger time steps without numerical instability issues compared to the explicit methods.

After solving the linear system in step 808, the values of the solution are obtained at the next time step, $u^{n+1}$, and they are used in step 810 for updating the velocity model. A cost function that describes the misfit between the input data d and the synthetic data u may be used in this step. This process is repeated for subsequent time steps by updating the vectors and matrix according to the new time step, until a certain condition is met in step 812. The condition may be related to a certain number of iterations, or to a given time period, etc.

Note that the velocity model is a representation of the subsurface that describes how the speed of seismic waves changes with depth. It provides information about the variation in seismic wave velocities within the Earth's layers. Velocity models are needed for seismic data processing and imaging. They help seismic data processing software to accurately calculate the travel times of seismic waves as they propagate through the subsurface. This information is required for creating seismic images as the velocity model indicates the locations in the subsurface where the seismic waves will be reflected, refracted, and those locations form the image of the subsurface. Velocity models are constructed by analyzing seismic data and using various techniques, such as seismic tomography, to estimate the velocities of subsurface materials at different depths.

Once the final solution is obtained, the results are transformed, in step 814, into an image of the subsurface, which shows one or more features indicative of an oil or gas reservoir, an appropriate $CO_2$ storage reservoir, ore resources, or a strong layer that can support wind turbines.

The implicit finite-difference method is particularly useful for problems with stiff differential equations, where explicit methods require extremely small-time steps for stability. However, it does require solving a system of equations at each time step, which can be computationally expensive for large grids. Nonetheless, it is a powerful technique for accurately simulating a wide range of physical phenomena.

Figure 9A:
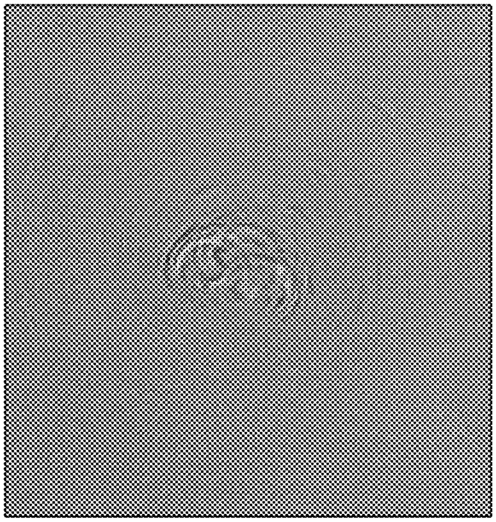
FIG. 9A illustrates a forward modelled wavefield snapshot using a single compute node.
Figure 9B:
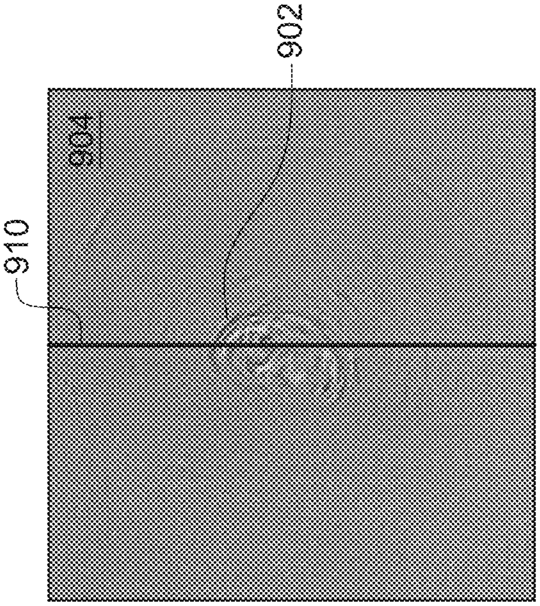
FIG. 9B illustrates the same wavefield snapshot using domain decomposition where the main domain is split into two subdomains.
Figure 9C:
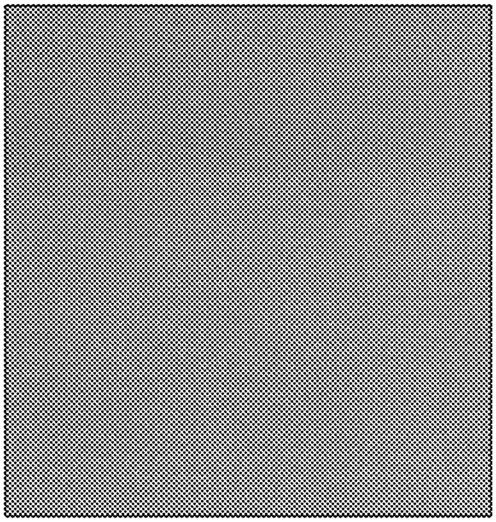
FIG. 9C illustrates a difference of the snapshots between single node and multiple nodes.

The results achieved with the method of FIG. 8 are now discussed. FIG. 9A shows a wavefield snapshot modeled with a single GPU node using the velocity model from SEG Advanced Modeling corporation (SEAM model), while FIG. 9B shows the snapshot, at the same time, but modeled with two GPU nodes through domain decomposition (the two subdomains are separated by line 910 and a formation 902 is imagined in the subsurface 904), based on the method of FIG. 8. FIG. 9C shows the difference between them, which is barely visible after a gain of 20 dB. This proves that the 2-node simulation gives practically identical results as the single-node simulation.

When compared to the single-node simulation, the 2-node simulation through domain decomposition can use twice the memory, and therefore, increase the modeling frequency by 25%. To evaluate the performance of the 2-node scheme, the inventors first selected a modeling frequency such that the memory is almost fully utilized for a single node, and then increased the frequency by 25% for the 2-node simulation. The inventors observed that, after considering the difference in the node number and frequency, the normalized cost of the 2-node simulation is approximately 30% higher than the single-node simulation. This cost overhead can be reduced by utilizing network cards of a higher bandwidth. It is noted that more GPU nodes can be used to further increase the modeling frequency with a potentially higher overhead, which is due to the larger data exchange.

Figure 10A:
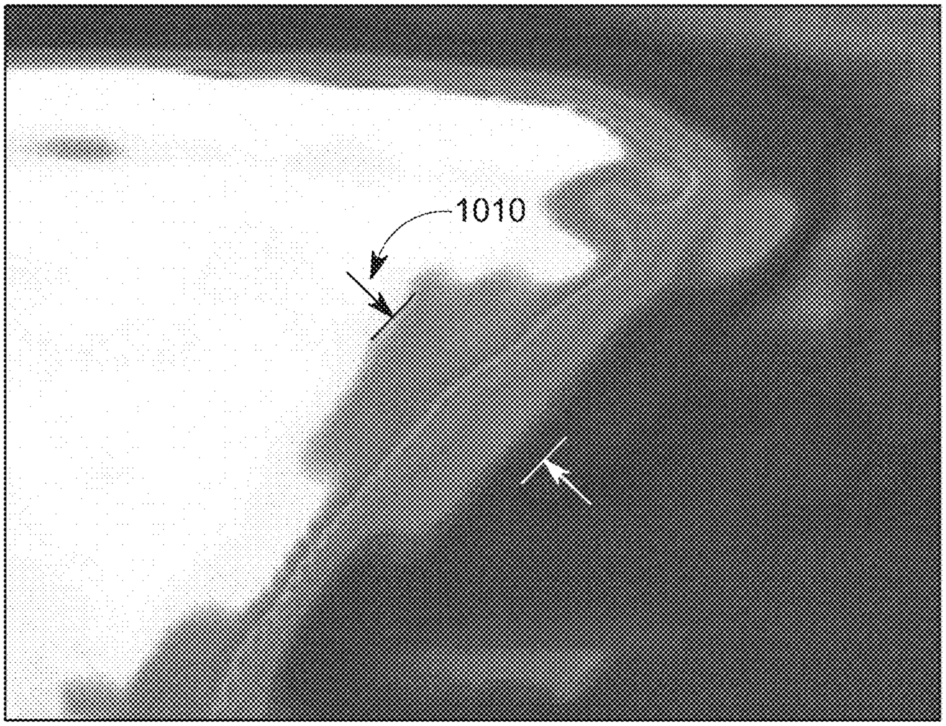
Figure 10B:
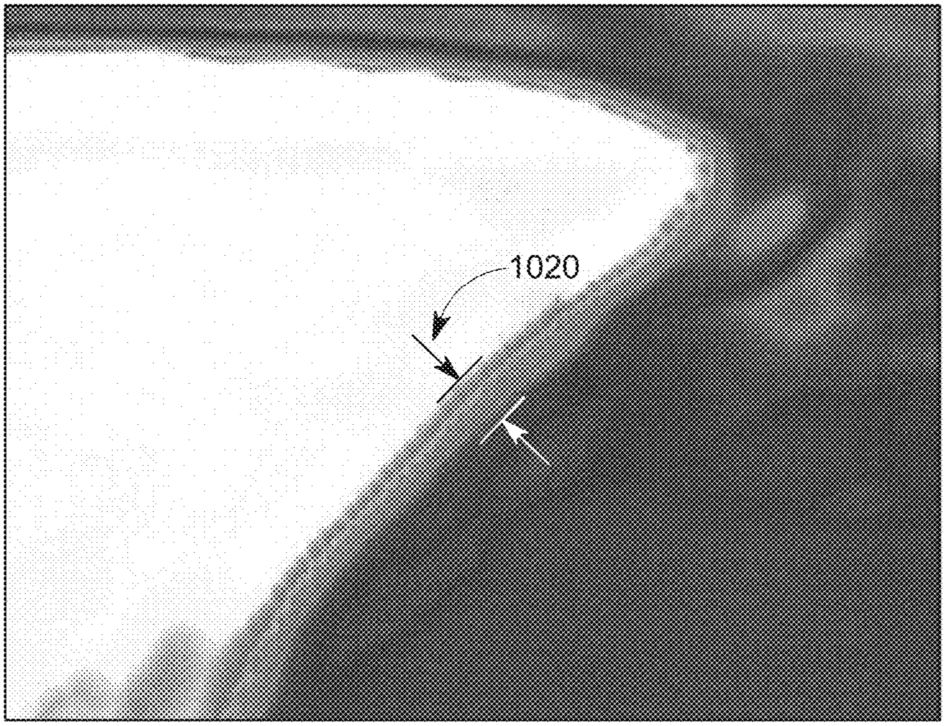
FIG. 10B illustrates reduced salt halo when elastic FWI is applied of the same frequency.

With the domain decomposition approach proposed above, high frequency elastic FWI could be performed using ocean bottom node (OBN) data. As shown in FIGS. 10A and 10B, elastic FWI (illustrated in FIG. 10B) greatly reduces the salt halo 1010 observed in acoustic FWI (illustrated in FIG. 10A) of the same frequency. Note that the new salt halo 1020 in FIG. 10B is much reduced.

High-frequency elastic FWI requires substantial memory resources that could exceed the capacity of a single GPU node. This limitation was successfully overcome in the above embodiments by using multiple nodes, for one wavefield simulation, through domain decomposition. One or more of the above discussed embodiments reduced the overhead from the cross-node data exchange by optimizing the finite-difference scheme, for example, choosing a preferred splitting direction, and parallelizing communication and computation. This approach makes high frequency elastic FWI possible and affordable with average GPU cards, which is desirable for achieving the full potential of the recorded seismic data.

The method described above with regard to FIG. 8 may be applied to the field of subsurface exploration, for example, hydrocarbon exploration and development, geothermal exploration and development, and carbon capture and sequestration, or other natural resource exploration and exploitation. It could also be employed for surveying and monitoring for windfarm applications, both onshore and offshore, and also for medical imaging applications.

Figure 11:
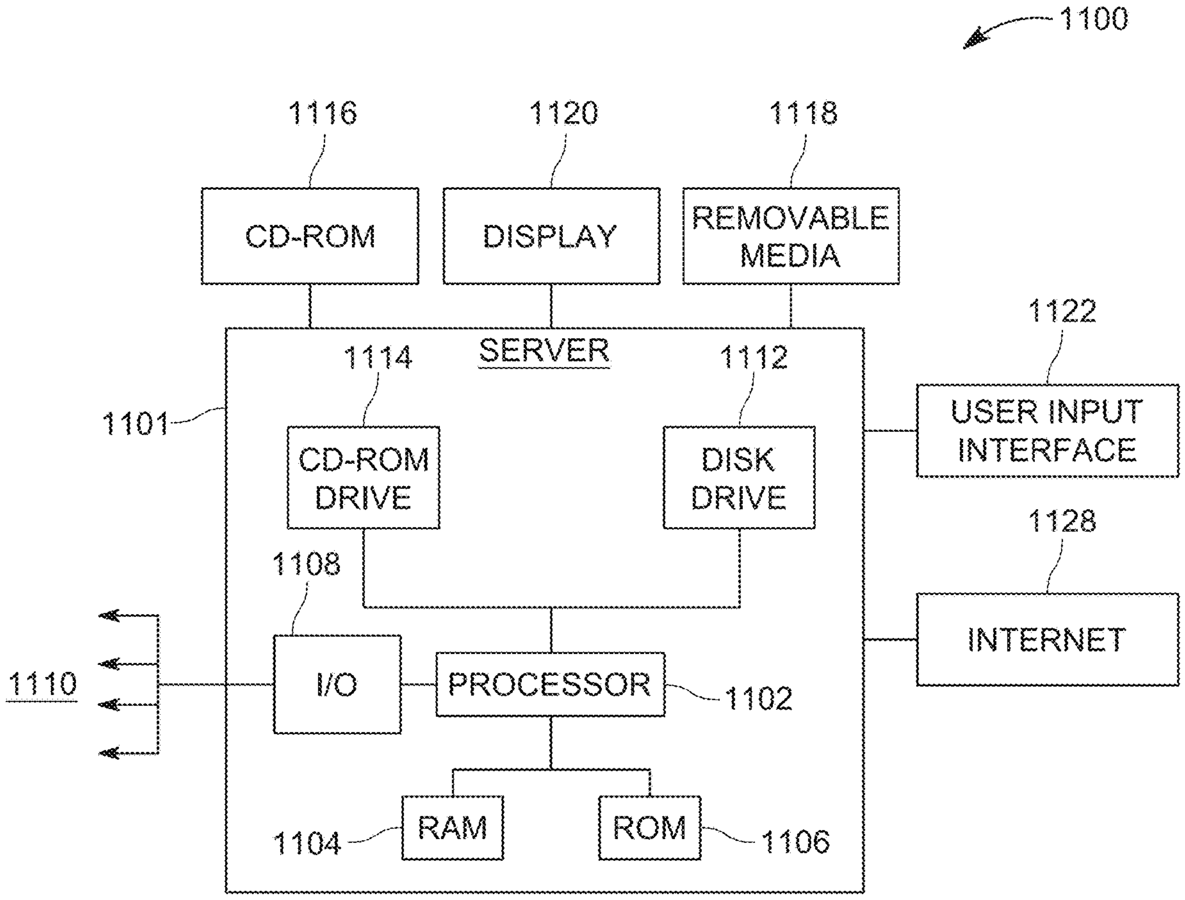
FIG. 11 is a schematic diagram of a computing device that is configured to implement the methods discussed herein.

The above-discussed procedures and methods may be implemented in a compute device 310 having the structure illustrated in FIG. 11. Hardware, firmware, software or a combination thereof may be used to perform the various steps and operations described herein. Computing device 1100 (which corresponds to compute node 310) is suitable for performing the activities described in the above embodiments and may include a server 1101. Such a server 1101 may include a central processor (CPU) 1102 (corresponding to CPU 312) coupled to a random access memory (RAM) 1104 and to a read-only memory (ROM) 1106. ROM 1106 may also be other types of storage media to store programs, such as programmable ROM (PROM), erasable PROM (EPROM), etc. Processor 1102 may communicate with other internal and external components through input/output (I/O) circuitry 1108 and bussing 1110 to provide control signals and the like. Processor 1102 carries out a variety of functions as are known in the art, as dictated by software and/or firmware instructions. Compute device 1100 also includes plural GPUs 1103 (corresponding to GPUs 314).

Server 1101 may also include one or more data storage devices, including hard drives 1112, CD-ROM drives 1114 and other hardware capable of reading and/or storing information, such as DVD, etc. In one embodiment, software for carrying out the above-discussed steps may be stored and distributed on a CD-ROM or DVD 1116, a USB storage device 1118 or other form of media capable of portably storing information. These storage media may be inserted into, and read by, devices such as CD-ROM drive 1114, disk drive 1112, etc. Server 1101 may be coupled to a display 1120, which may be any type of known display or presentation screen, such as LCD, plasma display, cathode ray tube (CRT), etc. A user input interface 1122 is provided, including one or more user interface mechanisms such as a mouse, keyboard, microphone, touchpad, touch screen, voice-recognition system, etc.

Server 1101 may be coupled to other devices, such as sources, sensors, or any other seismic data system. The server may be part of a larger network configuration as in a global area network (GAN) such as the Internet 1128, which allows ultimate connection to various landline and/or mobile computing devices.

As described above, the apparatus 1100 may be embodied by a computing device. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processor 1102 may be configured to execute instructions stored in the memory device 1104 or otherwise accessible to the processor. Alternatively, or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The term "about" is used in this application to mean a variation of up to 20% of the parameter characterized by this term.

It will be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the present disclosure. The first object or step, and the second object or step, are both, objects or steps, respectively, but they are not to be considered the same object or step.

The terminology used in the description herein is for the purpose of describing particular embodiments and is not intended to be limiting. As used in this description and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

The disclosed embodiments provide a methodology for performing domain decomposition for high-frequency elastic FWI. It should be understood that this description is not intended to limit the invention. On the contrary, the embodiments are intended to cover alternatives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

REFERENCES

The entire content of all the publications listed herein is incorporated by reference in this patent application.

[1] Lailly, P. (1983) The Seismic Inverse Problem as a Sequence of before Stack Migrations. In: Bednar, J. B., Robinson, E. and Weglein, A., Eds., Conference on Inverse Scattering-Theory and Application, SIAM, Philadelphia, 206-220.

[2] Tarantola, A., 1984, Inversion of seismic reflection data in the acoustic approximation: GEOPHYSICS, 49(8), 1259-1266.

[3] Q. Zhang, W. Mao, H. Zhou, H. Zhang, Y. Chen, Hybrid-domain simultaneous-source full waveform inversion without crosstalk noise, Geophysical Journal International, Volume 215, Issue 3, December 2018, Pages 1659-1681.

[4] Mora, P., and Z. Wu, 2018, Elastic versus acoustic inversion for marine surveys: Geophysical Journal International, 214(1), 596-622.

[5] Okita, N. T., Camargo, A. W., Ribeiro, J., Coimbra, T. A., Benedicto, C, and Faccipieri, J. H. High-performance computing strategies for seismic-imaging software on the cluster and cloud-computing environments, Geophysical Prospecting, 70, 57-78.

[6] Weiss, R. M. and Shragge, J. Solving 3D anisotropic elastic wave equations on parallel GPU devices. Geophysics, 78(2), F7-F15.

[7] Ascher, U. M., Ruuth, S. J., Spiteri, R. J., Implicit-Explicit Runge-Kutta Methods for Time-Dependent Partial Differential Equations, Appl. Numer. Math, vol. 25(2-3), 1997.

What is claimed is:

1. A method for imaging a formation of a subsurface, the method comprising:

receiving input data d related to the subsurface;

discretizing a domain of the input data d along three different axes, selecting a first axis having a largest number of grid points, and splitting the domain along the selected first axis into plural subdomains corresponding to plural graphics processor units (GPUs);

generating synthetic data u related to the subsurface, by applying an implicit finite-difference approach to a reflectivity model r on the plural GPUs, wherein applying the implicit finite-difference approach comprises:

performing, in each GPU for a corresponding subdomain of the plural domains, first order partial derivatives along second and third axes without coordinating with other GPUS, performing first order partial derivatives along the first axis except for overlapping areas between adjacent subdomains, and, for the overlapping areas, exchanging data with the other GPUs prior to performing the first order partial derivatives along the first axis;

updating a velocity model V based on the input data d and the synthetic data u; and generating an image of the formation in the subsurface based on the updated velocity model, wherein the image is used to locate natural resources.

2. The method of claim 1, further comprising:

discretizing the reflectivity model to form a system of linear equations.

3. The method of claim 2, wherein the implicit finite-difference approach comprises:

calculating a first order partial derivative $P'(x_i)$ of a quantity P, with respect to a spatial variable x, as a sum of 2M+1 products of (1) an implicit finite-difference coefficient $b_j$ and (2) the first order partial derivative $P'(x_{i+j})$, where $x_i$ is a discrete point, $x_{i+j}$ is another discrete point, i describes a point where the first order partial derivative is calculated, i+j describes a point where the implicit finite-difference is calculated, and M is related to a stencil size.

4. The method of claim 3, wherein the stencil size for the implicit finite-difference approach for the input data d is smaller than a stencil size for an explicit finite-different approach for the input data d.

5. The method of claim 1, wherein teh plural GPUs are configured to, selecting corresponding overlapping areas between pairs of adjacent subdomains of the plural subdomains; and performing, in each GPU of the plural GPUs, for the corresponding subdomain, the first order partial derivatives along the first axis of the three axes, except for the corresponding overlapping area, without coordinating with the other GPUs for the other subdomains.

6. The method of claim 5, further comprising:

for the corresponding overlapping area, exchanging data with the other GPUs, and only then performing first order partial derivatives along the first axis of the three axes.

7. A computing system for imaging a formation of a subsurface, the computing system comprising:

plural compute nodes, each compute node comprising, an interface configured to receive input data d related to the subsurface; and plural graphics processor units, GPUs connected to the interface, and configured to, discretizing a domain of the input data d along three different axes, selecting a first axis having a largest number of grid points, and splitting the domain along the selected first axis into plural subdomains corresponding to plural graphics processor units (GPUs);

generate synthetic data u related to the subsurface, by applying an implicit finite-difference approach to a reflectivity model r, wherein applying the implicit finite-difference approach comprises:

performing, in each GPU for a corresponding subdomain of the plural domains, first order partial derivatives along second and third axes without coordinating with other GPUs, performing first order partial derivatives along the first axis except for overlapping areas between adjacent subdomains, and, for the overlapping areas, exchanging data with the other GPUs prior to performing the first order partial derivatives along the first axis;

update a velocity model V based on the input data d and the synthetic data u; and generate an image of the formation in the subsurface based on the updated velocity model, wherein the image is used to locate natural resources.

8. The computing system of claim 7, wherein the implicit finite-difference approach is run on the plural GPUs.

9. The computing system of claim 7, wherein the GPUs are further configured to:

discretize the reflectivity model to form a system of linear equations.

10. The computing system of claim 9, wherein the implicit finite-difference approach comprises:

calculating a first order partial derivative $P'(x_i)$ of a quantity P, with respect to a spatial variable x, as a sum of 2M+1 products of (1) an implicit finite-difference coefficient $b_j$ and (2) the first order partial derivative $P'(x_{i+j})$, where x; is a discrete point, $x_{i+j}$ is another discrete point, i describes a point where the first order partial derivative is calculated, i+j describes a point where the implicit finite-difference is calculated, and Mis related to a stencil size.

11. The computing system of claim 10, wherein the stencil size for the implicit finite-difference approach for the input data d is smaller than a stencil size for an explicit finite-different approach for the input data d.

12. The computing system of claim 7, wherein the plural GPUs are configured to, select corresponding overlapping areas between pairs of adjacent subdomains of the plural subdomains, and performing, in each GPU of the plural GPUs, for the corresponding subdomain, the first order partial derivatives along the first axis of the three axes, except for the corresponding overlapping area, without coordinating with the other GPUs for the other subdomains.

13. The computing system of claim 12, wherein a GPU of the plural GPUs is configured to exchange data, for the corresponding overlapping area, with the other GPUs, and only then performing first order partial derivatives along the first axis of the three axes.

14. The computing system of claim 7, wherein the input data is seismic data.

15. A non-transitory computer readable medium including computer executable instructions, wherein the instructions, when executed by one or more graphics processor units, implement a method for imaging a formation in a subsurface, the medium comprising instructions for:

receiving input data d related to the subsurface;

discretizing a domain of the input data d along three different axes, selecting a first axis having a largest number of grid points, and splitting the domain along the selected first axis into plural subdomains corresponding to plural graphics processor units (GPUs):

generating synthetic data u related to the subsurface, by applying an implicit finite-difference approach to a reflectivity model r on the plural GPUs, wherein applying the implicit finite-difference approach comprises:

performing, in each GPU for a corresponding subdomain of the plural domains, first order partial derivatives along second and third axes without coordinating with other GPUS, performing first order partial derivatives along the first axis except for overlapping areas between adjacent subdomains, and, for the overlapping areas, exchanging data with the other GPUs prior to performing the first order partial derivatives along the first axis;

updating a velocity model V based on the input data d and the synthetic data u; and generating an image of the formation in the subsurface based on the updated velocity model, wherein the image is used to locate natural resources.

* * * * *